United States Patent
Ellingsen, Jr.

(10) Patent No.: US 7,296,545 B2
(45) Date of Patent: Nov. 20, 2007

(54) COAXIAL POPPET VALVE

(76) Inventor: Raymond Lorel Ellingsen, Jr., 508 Reichow St., Oshkosh, WI (US) 54902

( * ) Notice: Subject to any disclaimer, the term of this patent is extended or adjusted under 35 U.S.C. 154(b) by 123 days.

(21) Appl. No.: 11/208,832

(22) Filed: Aug. 22, 2005

(65) Prior Publication Data

US 2007/0039584 A1 Feb. 22, 2007

(51) Int. Cl.
F01L 1/28 (2006.01)
(52) U.S. Cl. .................. 123/79 C; 123/188.2
(58) Field of Classification Search .......... 123/79 C, 123/188.2
See application file for complete search history.

(56) References Cited

U.S. PATENT DOCUMENTS

| | | | |
|---|---|---|---|
| 1,191,150 A * | 7/1916 | Brown ............ | 123/79 C |
| 1,493,419 A * | 5/1924 | Asbury ............ | 123/79 R |
| 2,303,324 A * | 12/1942 | Brumby ........... | 123/79 C |
| 2,863,429 A * | 12/1958 | Bouteleux ........ | 123/90.22 |
| 3,640,261 A | 2/1972 | Josey | |
| 3,653,368 A | 4/1972 | Scherenberg | |
| 3,820,522 A | 6/1974 | Scherenberg | |
| 3,903,855 A | 9/1975 | Klakulak et al. | |
| 3,995,609 A | 12/1976 | Klomp | |
| 4,094,277 A | 6/1978 | Goto et al. | |
| 4,362,134 A | 12/1982 | Worthen | |
| 4,539,950 A * | 9/1985 | Schaich ............ | 123/79 C |
| 4,836,154 A | 6/1989 | Bergeron | |
| 5,005,538 A | 4/1991 | Bergeron | |
| 5,085,179 A * | 2/1992 | Faulkner .......... | 123/70 R |
| 5,357,914 A * | 10/1994 | Huff ............... | 123/79 C |
| 6,138,616 A * | 10/2000 | Svensson .......... | 123/26 |
| 6,237,549 B1 | 5/2001 | Huff | |
| 6,546,902 B1 | 4/2003 | Davis | |
| 6,659,059 B1 | 12/2003 | Huff | |

* cited by examiner

Primary Examiner—Marguerite McMahon
(74) Attorney, Agent, or Firm—Boyle Fredrickson, S.C.

(57) ABSTRACT

A two-piece intake assembly such as a coaxial poppet valve includes a main poppet valve with a stem attached to a head and an auxiliary poppet valve movable on the inner valve. A guiding element on the outer valve is configured to receive the inner valve stem, and is connected to an outer valve head configured to mate with the inner valve head and form a seal. The assembly provides a first vent opening formed by the action of a rocker arm on the inner valve stem and a second opening formed by the pressure differential between the combustion chamber and the intake port.

17 Claims, 4 Drawing Sheets

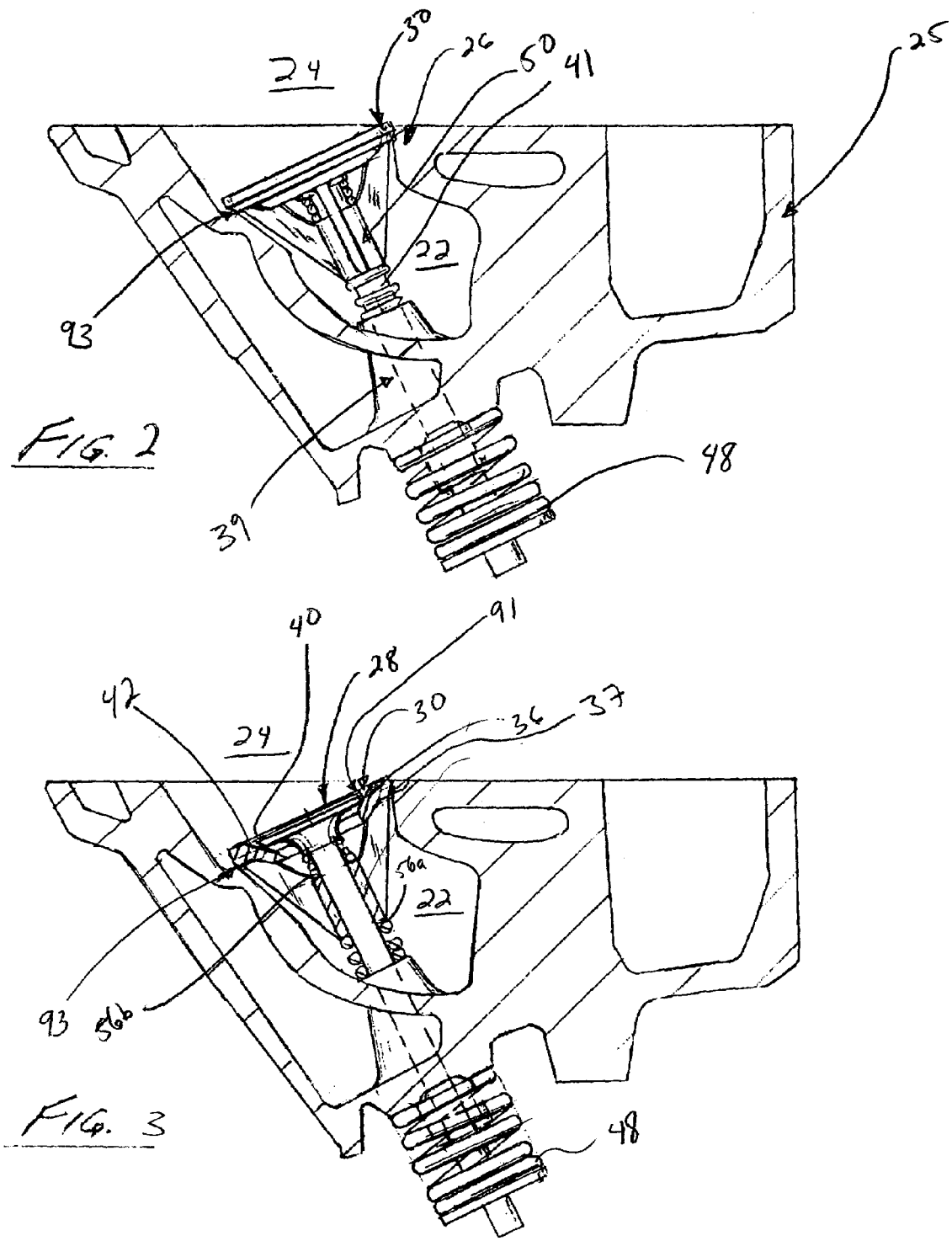

COAXIAL POPPET VALVE

BACKGROUND OF THE INVENTION

1. Field of the Invention

The present invention relates to an intake valve for an internal combustion engine. More specifically, the invention relates to a coaxial or two piece poppet valve that includes an inner and an outer valve for increasing the efficiency and performance of the engine.

2. Discussion of the Related Art

Internal combustion engines are well known in the art and used in a variety of different applications. A typical internal combustion engine employs valves to control the flow of atmosphere to and from the combustion chamber. The majority of known prior art valves are a single piece, having one spring retainer and various spring control arrangements to connect the valve to the rocker arm of an engine.

It has long been recognized that the efficiency of this valve arrangement is a major factor in the performance of the entire engine. As a result, several attempts have been made to maximize the potential flow dimensions of these valves. Since a homogenous air fuel mixture is also an important factor in the performance of internal combustion engines, many attempts to use the one-piece valve arrangement have sought to create a swirl affect in addition to increasing the over flow of the valve.

Increasing the flow dimension allowed by the intake valve automatically increases the power of the engine. Similarly, creating a more homogenous air fuel mixture also increases the power of the engine by breaking down the fuel into smaller particles that can be more easily combusted. The resulting effect of an increase in flow dimension or the homogeneity of the mixture, additionally increases fuel efficiency and reduces the environmentally damaging emissions of internal combustion engine. In a time of ever rising oil and gasoline costs, there is a real premium on fuel efficiency for engines. The value of reducing the harmful effects of pollution on the environment has also long been recognized.

The timing and control of the valve arrangement is also a major factor in the performance of the entire engine. As a result, numerous attempts to maximize valve timing over a broad range of constantly variable conditions such as load, speed, and atmosphere have also been explored. Additionally, the size of the valve is a major factor in the performance of the engine. The sizing of the valve is critical, and depends on the bore stroke ratio plus the combustion chamber shape. In many cases, combustion chamber shape dictates that the valve be shrouded on part of its open area creating an impediment to maximum atmospheric flow. The height of the valve lift is also critical in this aspect. Both increasing the lift of the valve and the unshielded area of the valve can allow more fuel inlet volume. This results in improved performance. In addition to these features, the weight of the valve as well as the weight of the springs that hold the valve in place have to resist the inertia forces on the valve such as a revolutions per minute (R.P.M.) increase. As the inertia forces go up, the valve springs require much more strength.

Other attempts have been made to create a valve with superior flow characteristics, or adding additional area into the valve. These prior art mechanisms are often complicated resulting in costly manufacturing and performance problems. For example, U.S. Pat. Nos. 6,237,549 and 5,357,914 to Huff the disclosures of which are hereby expressly incorporated by reference, illustrate attempts to provide a more efficient valve assembly by providing a vented valve. Huff's valve, however, exhibits numerous deficiencies. For example, Huff's valve includes a spring-loaded inner valve that may or may not close or seal. Huff's valve allows the inner valve to float with the spring behind it, therefore inertia forces, bounce, etc. can all effect the timing. Huff's patents specifically note that the inertia forces and the intake gas pressure differentials cause this inner valve to open and close. Therefore, there is no specific timing.

In contrast, the particular invention herein disclosed uses a main valve with an additional auxiliary valve that is easily manufactured and will fit in standard engines without additional modifications. In some embodiments, the springs in this particular assembly may or may not be used depending on the application of the particular unit. The springs are used to further isolate the outer valve from the inner valve and restrain it from erratic motions, soften the closure, etc. Preferably, there are only two spring seats and the seats are concentric on the outer valve. These seats are standard in configuration with no unusual or complicated areas.

The disclosed valve arrangement also allows the valves to rotate and keep the seats in good working condition for a much longer service life. There is no hindrance to any motion due to the additional valve outer valve. The control of the outer valve, as far as the ratio of the inner opening to the outer opening, is controlled by the fuel flow through the engine. In prior art valves, the larger the valve the more difficult it is for fuel to make that 90 degree turn at the valve and then exit through the small opening. The disclosed central opening relieves the pressure congestion at the middle of the intake port allowing the flow between the two openings to be dictated by the shielding of the outer valve and the size of the inner opening. Both openings are automatically adjusted, while open, not by any mechanical means, but by the pressure differential and the two springs of the assembly. When the valve is closed and sealed, the sealing is specifically tight and there is no ambiguity on the sealing surfaces as is in Huff's. Using the disclosed coaxial valve, the outer valve moves only to adjust the opening between the outer diameter and the inner diameter valve openings. This maximizes the flow through the valve reducing the shielded area on the large valve and also opening the center valve to reduce the pressure of the hard right angle turn on the normal large size intake valve.

As may be seen from the foregoing analysis, there have been some attempts to provide an intake valve that allows for increased power and fuel efficiency. These valves have not addressed several of the deficiencies in the art. Most of these prior art devices include complex mechanisms, cannot be easily retrofitted, and require considerable effort to install. Many of the devices are not robust enough to meet the demands of most high-powered engines.

What is therefore needed in light of the above is a valve assembly that exhibits enhanced robustness, increased power and efficiency. There is a further need for a valve assembly that can be easily used with existing internal combustion engines.

SUMMARY AND OBJECTS OF THE INVENTION

In view of the foregoing, it is one object of the present invention to provide a valve assembly with increased, fuel efficiency, power and performance. It is another object of the present invention to provide a valve assembly that exhibits improved flow, dimension (volume), homogenous air/fuel charge conditioning and multidimensional constant variable valve timing. It is still another object to provide a valve that unshields certain aspects of the valve lift. It is further object of the disclosed invention to address other important factors concerning the manufacture and implementation of the assembly.

Consistent with the foregoing objects, and in accordance with the invention as embodied and broadly described herein, a coaxial poppet valve, a method of increasing flow dimension in an internal combustion engine, and a two-piece intake valve assembly are disclosed in suitable detail to enable one of ordinary skill in the art to make and use the invention.

In accordance with a first aspect of the invention, the above and other objects are achieved by providing a coaxial poppet valve that includes a main poppet valve having a valve stem and a disc and an auxiliary poppet valve having a disc configured to fit around the main poppet valve. The auxiliary valve forms a seal between a port tube and a combustion chamber and is slidably attached to the main poppet valve stem. The coaxial poppet valve may include at least one spring between the auxiliary poppet valve and the main poppet valve. In one embodiment, an upper spring is located between an auxiliary poppet valve guiding element and the disc portion of the main poppet valve. A lower spring is located between the guiding element and a valve guide. In another embodiment, the auxiliary poppet valve includes an annular support connected to the auxiliary poppet valve disc portion and configured to slidably receive the main poppet valve.

The auxiliary poppet valve may include a plurality of spaced disc supports extending between the auxiliary disc and the annular support. In one embodiment, the disc of the main poppet valve has a side wall with an outer surface configured to fit within an inner surface of the auxiliary poppet valve disc and form a seal between the main poppet valve and the auxiliary poppet valve. The auxiliary poppet valve disc may also include an outer wall configured to mate with a valve seat and form a seal therebetween. When the coaxial poppet valve is displaced during an induction cycle, a first opening is defined between the main poppet valve and the auxiliary poppet valve and a second opening is defined between the auxiliary poppet valve and the valve seat. The first opening is preferably formed by the displacement of the main poppet valve by a rocker arm and the second opening is formed by the pressure differential between the combustion chamber and the intake port.

In accordance with a second aspect of the invention, a method of increasing flow dimension in an internal combustion engine includes the steps of securing an auxiliary poppet valve to a main poppet valve stem such that the disc of the main poppet valve forms an air tight seal with the disc portion of the auxiliary poppet valve, and placing the attached auxiliary poppet valve and main poppet valve between the intake port and the combustion chamber of an internal combustion engine. The auxiliary valve is slidably received on the main poppet valve stem. The method may also include the step of placing at least one spring between the auxiliary poppet and the main poppet. In one embodiment, the method includes placing an upper spring on a spring seat on an upper surface of an auxiliary poppet guiding member and placing a lower spring on a spring seat of a lower surface of the auxiliary poppet guiding member.

In accordance with a final aspect of the invention a two-piece intake valve assembly includes an inner valve having a stem attached to a head and an outer valve movable on the inner valve and having a guiding element configured to receive the inner valve stem. The guiding element is connected to an outer valve head configured to mate with the inner valve head and form a seal. The two-piece intake valve assembly may include at least one control spring configured to isolate the inner valve from the outer valve. In one embodiment the two-piece intake valve assembly includes a first spring located between the outer valve guiding element and the head of the inner valve and a second spring located between the guiding element and a valve guide.

The inner valve is configured to selectively open and close a first vent opening between the inner valve head and outer valve head and the outer valve is configured to selectively open and close a second vent opening between the outer valve head and a valve seat. In one embodiment, a plurality of spaced disc supports extend between the guiding element and the outer valve head. In another embodiment, the first vent opening is formed by the action of a rocker arm on the inner valve stem and the second opening is formed by the pressure differential between the combustion chamber and the intake port. The head of the inner valve has a side wall with an outer surface configured to fit within an inner surface of an auxiliary poppet valve head and form a seal between the inner valve and the outer valve and the outer valve head has an outer wall configured to mate with a valve seat and form a seal therebetween.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 2 is side view of the coaxial poppet valve in a sectional front view of a typical internal combustion engine;

FIG. 3 is a sectional front view of both the typical internal combustion engine and the coaxial poppet valve;

Figure 1:
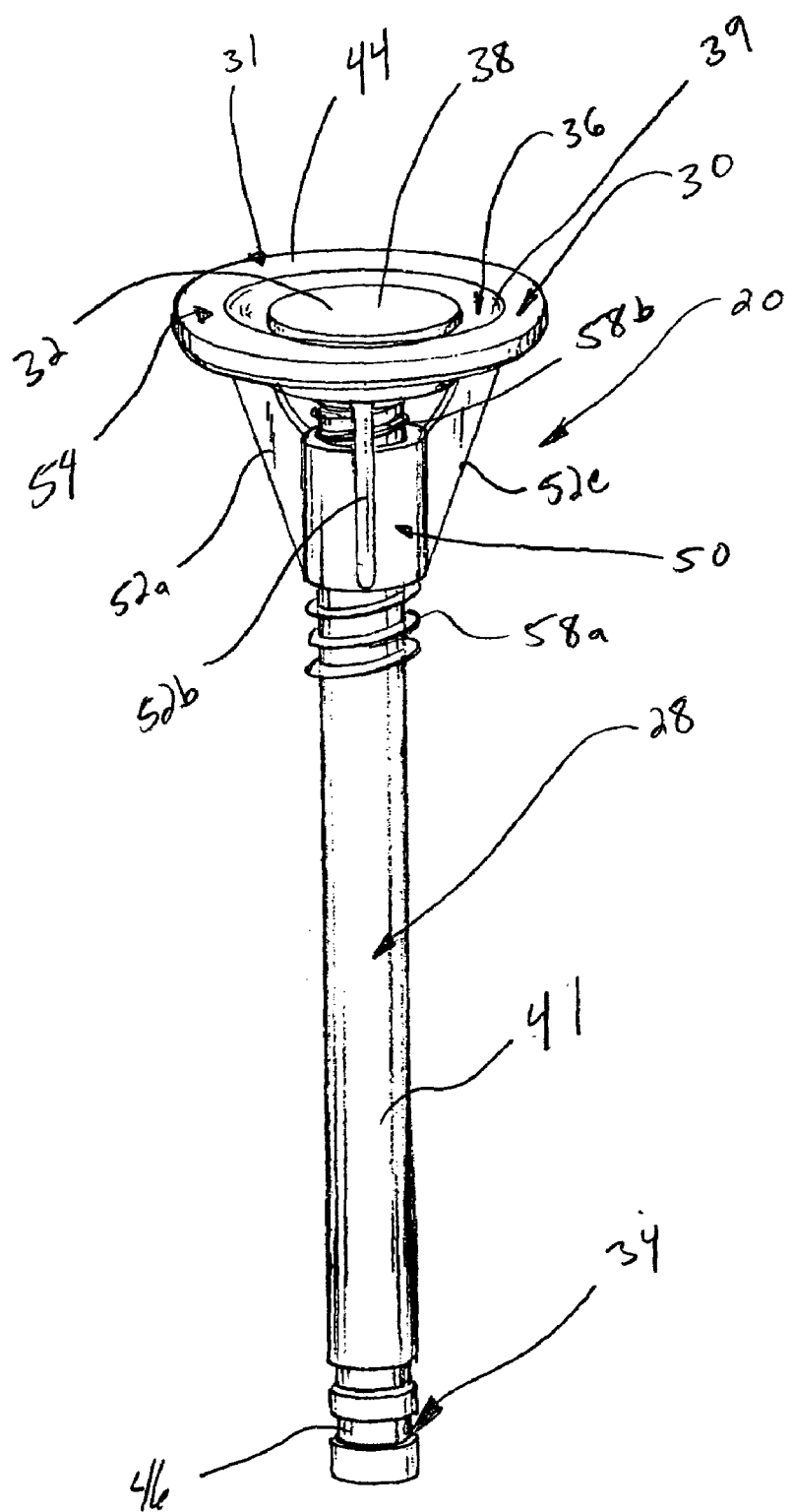
FIG. 1 is a perspective view of a coaxial poppet valve of the present invention.

In describing the preferred embodiments of the invention that are illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word "connected," "attached," or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

The present invention relates to a valve assembly, more specifically to a coaxial poppet valve, that includes a main poppet valve having a valve stem extending towards a rocker arm of an engine and a slidably attached auxiliary poppet valve with a head configured to fit around and retain the main poppet valve. The coaxial poppet valve forms a seal with two selectively engaged openings between a port tube and a combustion chamber. The coaxial poppet valve may include an upper spring between the auxiliary poppet valve guiding element and the head of the main poppet valve and a lower spring between the guiding element and a valve guide. The coaxial poppet valve preferably provides for improved air flow, dimension (volume), homogenous air/fuel charge conditioning and multidimensional constant variable valve timing.

2. Detailed Description of the Preferred Embodiments

FIGS. 1-5 illustrate a preferred embodiment of a two-piece intake valve assembly such as a coaxial poppet valve 20 of the present invention. As illustrated by FIGS. 2-5, two-piece intake valve assembly or coaxial poppet valve 20 is configured to seal between an intake port tube 22 and a combustion chamber 24 of an internal combustion engine 25. Internal combustion engines are well known in the art and as such, the details of such engines need not be described in detail herein. It is recognized that the disclosed coaxial poppet valve 20 can be utilized with a wide variety of known engines, for example, an automobile engine. Coaxial poppet valve 20 is configured to regulate the flow of an air-fuel mixture between the intake port tube 22 and the combustion chamber 24 by opening and closing at times corresponding with various engine cycles. As illustrated by FIGS. 2-5, a valve seat 26 is fitted at the end of intake port tube 22 to regulate the opening into combustion chamber 24 through which the air-fuel mixture passes.

In accordance with the invention, there is a coaxial poppet valve 20 for alternately opening and blocking the passage of an air-fuel mixture between intake port tube 22 and combustion chamber 24. As illustrated by FIG. 1, the coaxial poppet valve 20 includes an inner valve, preferably a main poppet valve 28 and an outer, preferably an auxiliary poppet valve 30 slidably received on the main poppet valve 28. Main poppet valve 28 is comprised of a valve stem 41 that includes disc portion, disc or valve head 32 at a first end and a standard valve stem end 34 at the opposed end. Valve stem end 34 may include machined grooves 46 to accept spring retainer locks (not shown) to lock an annular spring retainer (not shown) at the valve stem end 34 as is known in the art. The spring retainer preferably retains coil spring 48 (FIGS. 2-5) in a predetermined preload position and maintain constant pressure against the main poppet valve 28 in the direction of the fully closed position (FIGS. 2-3).

Main poppet valve disc portion 32 is configured to fit within the inner annular wall 36 of the disc, disc portion or head 31 of the auxiliary poppet valve 30 and maintain an airtight seal 91 between intake port tube 22 and combustion tube 24 when the coaxial poppet valve 22 in its fully closed position illustrated in FIGS. 2 and 3. Disc portion 32 includes a flat outer surface 38 and an angled or curved annular side wall 40. The angle of the side wall 40 corresponds to the angle cut into the inner annular wall 36 of the disc portion 44 of auxiliary poppet valve 30 so as to form a complete seal 91 when mated in the closed position (FIGS. 2 and 3). As illustrated by FIGS. 2-5, main poppet valve 28 is configured to slidably fit within the pathway defined by a standard valve guide 39. Valve guide 39 is formed as part of the overall head of an engine as is well known in the art.

Auxiliary poppet valve 30 is configured to slidably fit over the valve stem 41 of main poppet valve 28. Auxiliary poppet valve 30 is comprised of a guiding element, such as an annular support, or annular base sleeve 50 configured to slidably fit over main poppet valve stem 41. Annular base sleeve 50 preferably has a diameter that is slightly greater main poppet valve stem 41 to enable a smooth sliding action. Three disc supports 52a-c extend from the annular base sleeve 50 to the disc portion or head 31 of the auxiliary poppet valve 30. Auxiliary poppet valve disc portion 31 has a hole in the center configured to receive main poppet valve 32. As illustrated by the drawings, disc portion 31 of auxiliary poppet valve 30 includes a flat upper surface 54 and an angled annular wall 36. The annular wall 36 may be designed to incorporate many different traditional internal combustion engine valve designs. The outer surface or outer wall 37 of the angled annular wall 36 preferably corresponds to the angle, curvature or surface features of the annular valve seat 26 so as to form a complete seal 93 with the valve seat 26 when the valve is in the closed position, as illustrated in FIGS. 2 and 3. The angle of the inner surface or inner wall 39 of the annular side wall 36 corresponds to the angle, curvature or surface features cut into the annular side wall 40 of the main poppet valve 28 so as to form an airtight seal 91 between the main poppet valve 28 and auxiliary poppet valve 30 in the closed position.

Figure 5:
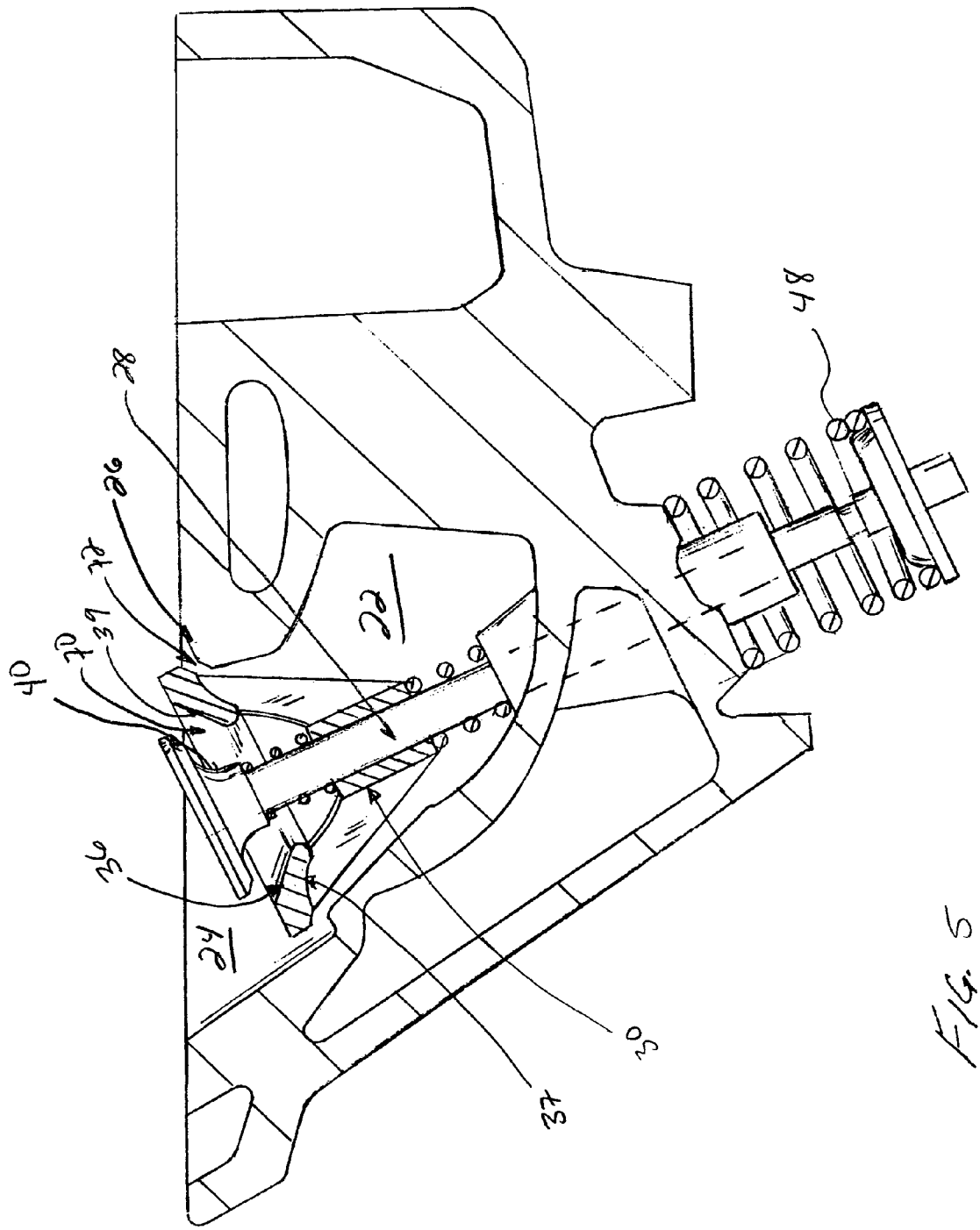
FIG. 5 is a sectional view of the internal combustion engine and coaxial poppet valve during the induction cycle, illustrating the coaxial poppet valve with the inner and outer valves in the fully open position.

Located on the lower and upper edges of the annular base sleeve 50 are spring seats 56a, 56b configured to receive a first or lower spring 58a and a second or upper spring 58b respectively. Spring 58a, 58b serves to bias and isolate the auxiliary poppet valve 30 and main poppet valve 28 in a predetermined position when both valves are in the open position (FIG. 5). The springs are used to further isolate the auxiliary poppet valve 30 and restrain it from erratic motions, soften the closure, etc. It should be understood that springs 58a, 58b in this particular assembly may or may not be used depending on the application of the particular unit. It should be understood that in the manufacture and sale of the coaxial poppet valve 20, the main poppet valve 28, auxiliary poppet valve 30 and springs 58a, 58b may preassembled as a unit. Although not shown, the main poppet valve stem 41 may further include annular oil seals. The components described are preferably constructed from iron, or steel, preferably stainless steel.

3. In Use and Operation

FIGS. 2 and 3 illustrate the coaxial poppet valve 20 in its resting state. During the resting state, coaxial poppet valve 20 and exhaust valve mechanism (not shown) are in the resting and fully closed positions such that the intake port tube 22 and an exhaust port (not shown), are blocked from communication with the combustion chamber 24 and a complete seal from combustion pressures created by the combustion process is facilitated. In the resting state, spring 48 biases main poppet valve 28 in the closed position against the angled inner annular wall 36 of auxiliary poppet valve 30. The force of the spring 48 acting on the main poppet valve 28 further serves to maintain the entire coaxial poppet valve 20 in the fully closed position such that the intake port tube 22 is blocked from fluid communication with the combustion chamber 24.

Figure 4:
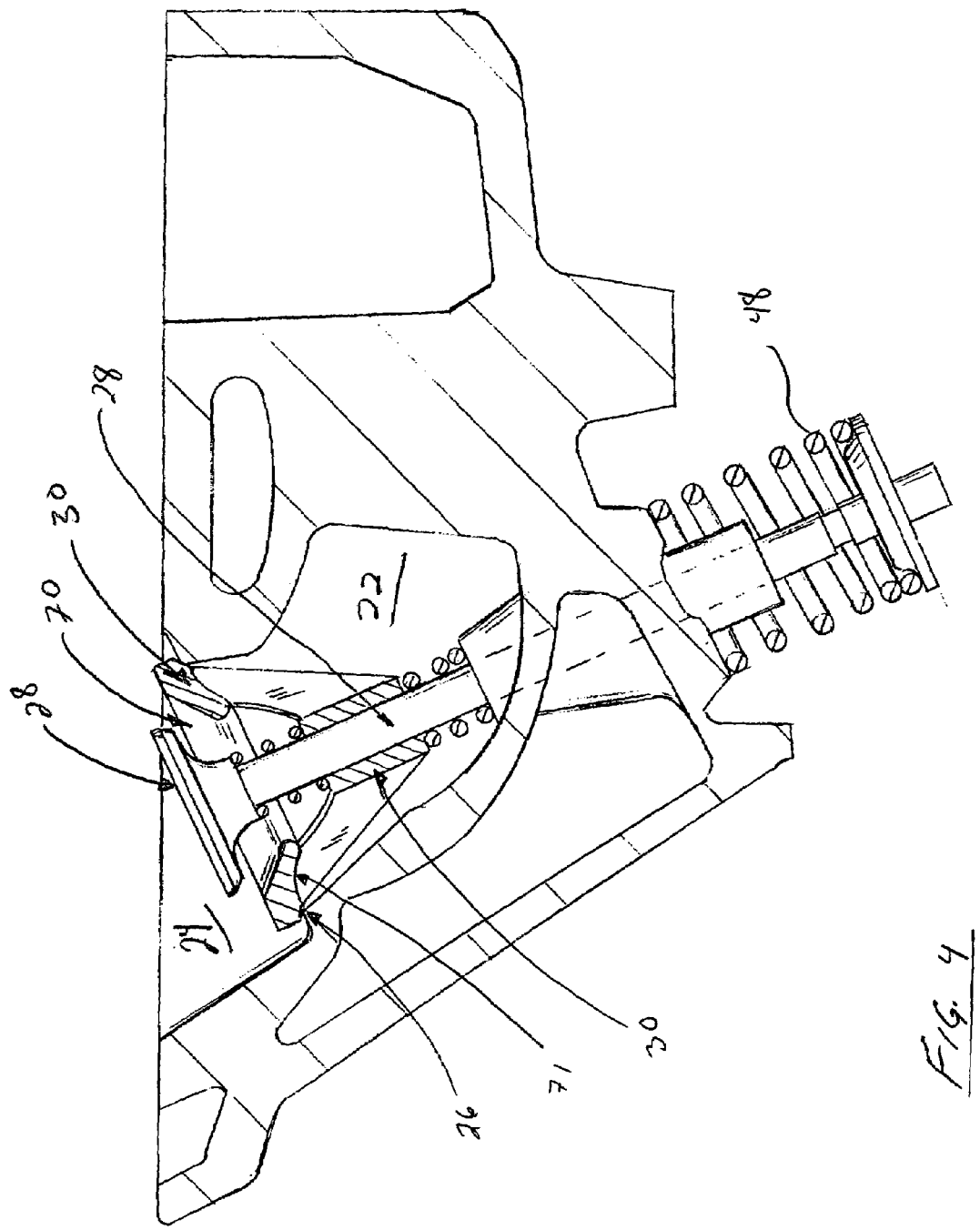
FIG. 4 is a sectional view of the internal combustion engine and the coaxial poppet valve during the induction cycle illustrating the inner valve in the fully open position, and the outer valve in a resting or fully closed position.

FIGS. 4 and 5 illustrate the coaxial poppet valve 20 during the during the induction cycle of a typical internal combustion engine. After the exhaust gases have been scavenged from the combustion chamber and the induction process begins, a piston (not shown), begins to move rapidly down the cylinder (not shown) and is sealed against the cylinder by means of multiple rings. This creates a rapid pressure drop in the combustion chamber 24 which at a certain point becomes lower than the pressure in the intake port 22. This pressure differential applies force against the port side of the coaxial poppet valve 20. As depicted in FIG. 4, main poppet valve 28 is displaced via a rocker arm (not shown) connected to the valve stem 24 in the direction of the open position in a predetermined timed sequence as is known in the art. As main poppet valve 28 is displaced independent of the auxiliary poppet valve 30, the atmosphere mixture flows from the port 22 through a first opening or first vent opening 70 between main poppet valve 28 and auxiliary poppet valve 30, into the combustion chamber 24.

As the main poppet valve 28 is displaced, it no longer retains the auxiliary poppet valve 30 in the closed position. As illustrated by FIG. 5, the pressure differential applies force against the port side 71 of the auxiliary poppet valve 30 causing the auxiliary poppet valve 30 to be displaced from the valve seat 26 allowing the flow of atmosphere mixture from the port 22 through the first vent opening 70 between main poppet valve 28 and auxiliary poppet valve 30, as well as a second opening or second vent opening 72 between the auxiliary poppet valve 30 and the valve seat 22. Springs 58a, 58b maintain bias and isolate the auxiliary poppet valve 30 and main poppet 28 thereby maintaining second vent opening 72.

The aforementioned pressure differential, which is responsible for the auxiliary poppet valve's cumulative actuation and displacement, changes its timing in relation to crank angle throughout the R.P.M. (revolutions per minute) range. It also changes in response to throttle position. Since the main poppet valve 28 actuation is independent of the auxiliary poppet valve 30 actuation, the auxiliary poppet valve automatically responds to these changes with varied timing, duration and displacement once the main poppet valve 28 has been displaced. This broadens the torque and useful output range as well as improves the throttle response of a typical internal combustion engine.

As depicted in FIG. 5, when both main 28 and auxiliary 30 poppet valves are displaced open at the same time, open valve area is increased, which in turn improves flow dimension, increases velocity of the air/fuel atmosphere, and increases turbulence in the combustion chamber, which creates a more homogeneous a air/fuel charge. This significantly improves the performance, fuel efficiency, and emission quality of a typical internal combustion engine. Once the induction cycle completes, the rocker arm relieves the main poppet valve 28 and spring 48 returns the main poppet valve and underlying auxiliary poppet valve 30 to their fully closed positions.

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the invention discloses in one embodiment an auxiliary poppet valve 30 comprised of a guiding element and plurality of separately formed disc supports 52a-c. However, it should be recognized that the entire auxiliary poppet valve may include a variety of alternative configurations such as a single integrally formed disc support.

Moreover, as noted throughout the application the individual components need not be formed in the disclosed shapes, or assembled in the disclosed configuration, but could be provided in virtually any shape, and assembled in virtually any configuration, so as to provide for a coaxial poppet valve that includes an inner and outer valve.

Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

The invention claimed is:

1. A coaxial poppet valve comprising:
   a main poppet valve having a valve stem and a disc;
   an auxiliary poppet valve having a disc configured to fit around the main poppet valve and form a seal between a port tube and a combustion chamber, wherein the auxiliary poppet valve is slidably attached to the main poppet valve stem; and
   an upper spring located between an auxiliary poppet valve guiding element and the disc of the main poppet valve and a lower spring located between the guiding element and a valve guide.

2. The coaxial poppet valve of claim 1, wherein the auxiliary poppet valve comprises an annular support connected to the auxiliary poppet valve disc and configured to slidably receive the main poppet valve.

3. The coaxial poppet valve of claim 2, further comprising a plurality of spaced disc supports extending between the auxiliary poppet valve disc and the annular support.

4. The coaxial poppet valve of claim 1, wherein the disc of the main poppet valve has a side wall with an outer surface configured to fit within an inner surface of the auxiliary poppet valve disc and form a seal between the main poppet valve and the auxiliary poppet valve.

5. The coaxial poppet valve of claim 4, wherein the auxiliary poppet valve disc has an outer wall configured to mate with a valve seat and form a seal therebetween.

6. The coaxial poppet valve of claim 1, wherein a first opening is defined between main poppet valve and the auxiliary poppet valve and a second opening is defined between the auxiliary poppet valve and a valve seat when the coaxial poppet valve is displaced during an induction cycle.

7. The coaxial poppet valve of claim 6, wherein the first opening is formed by the displacement of the main poppet valve by a rocker arm and the second opening is formed by the pressure differential between a combustion chamber and an intake port tube.

8. The coaxial poppet valve of claim 1, wherein at least one disc has an outer wall.

9. The coaxial poppet valve of claim 1, further comprising a first vent opening formed by the action of a rocker arm on the valve stem and the second opening is formed by the pressure differential between a combustion chamber and intake port.

10. The coaxial poppet valve of claim 1, wherein the disc of the main poppet valve has a side wall with an outer surface configured to fit within an inner surface of the auxiliary poppet valve disc.

11. A method of increasing flow dimension in an internal combustion engine comprising;
   slidably attaching an auxiliary poppet valve to a valve stem of a main poppet valve such that a disc of the main poppet valve forms an air tight seal with a disc of the auxiliary poppet valve;
   placing the attached auxiliary poppet valve and main poppet valve between an intake port tube and a combustion chamber of an internal combustion engine; and
   placing an upper spring on a spring seat on an upper surface of an auxiliary poppet guiding member and placing a lower spring on a spring seat of a lower surface of the auxiliary poppet guiding member.

12. A two-piece intake valve assembly comprising:
   an inner valve having a stem attached to a head;
   an outer valve movable on the inner valve and having a guiding element configured to receive the inner valve stem, the guiding element connected to an outer valve head configured to mate with the inner valve head and form a seal; and
   a first spring located between the outer valve guiding element and the head of the inner valve and a second spring located between the outer valve guiding element and a valve guide.

13. The two-piece intake valve assembly of claim 12, wherein the inner valve is configured to selectively open and close a first vent opening between the inner valve head and outer valve head and the outer valve is configured to selectively open and close a second vent opening between the outer valve head and a valve seat.

14. The two-piece intake valve assembly of claim 12, further comprising a plurality of spaced disc supports extending between the guiding element and the outer valve head.

15. The two-piece intake valve assembly of claim 13, wherein the first vent opening is formed by the action of a rocker arm on the inner valve stem and the second opening is formed the pressure differential between the combustion chamber and the intake port.

16. The two-piece intake valve assembly of claim 12, wherein the head of the inner valve has a side wall with an outer surface configured to fit within an inner surface of the auxiliary poppet valve head and form a seal between the inner valve and the outer valve.

17. The two-piece intake valve assembly of claim 16, wherein the outer valve head has an outer wall configured to mate with a valve seat and form a seal therebetween.

* * * * *